United States Patent
Howell

(10) Patent No.: US 10,913,382 B2
(45) Date of Patent: Feb. 9, 2021

(54) PROTECTION DEVICE FOR A TOWED VEHICLE

(71) Applicant: Scott Colin Howell, Parkdale (AU)

(72) Inventor: Scott Colin Howell, Parkdale (AU)

(73) Assignee: JGC COMPONENTS PTY., LTD., Parkdale (AU)

( * ) Notice: Subject to any disclaimer, the term of this patent is extended or adjusted under 35 U.S.C. 154(b) by 0 days.

(21) Appl. No.: 16/506,818

(22) Filed: Jul. 9, 2019

(65) Prior Publication Data

US 2020/0108761 A1 Apr. 9, 2020

(30) Foreign Application Priority Data

Oct. 4, 2018 (AU) .................................. 2018241136

(51) Int. Cl.
  *B60P 3/10* (2006.01)
(52) U.S. Cl.
  CPC ........... *B60P 3/1041* (2013.01); *B60P 3/1066* (2013.01)
(58) Field of Classification Search
  CPC .............................. B60P 3/1041; B60P 3/1066
  See application file for complete search history.

(56) References Cited

U.S. PATENT DOCUMENTS

| | | | | |
|---|---|---|---|---|
| 6,616,188 B1 * | 9/2003 | Jefferies | ..................... | B60P 3/10 280/152.3 |
| 6,722,726 B1 * | 4/2004 | Parmer | ..................... | B60P 3/06 296/157 |
| 6,725,796 B2 * | 4/2004 | Mensch | ..................... | B63C 13/00 114/344 |
| 7,461,853 B1 * | 12/2008 | Larson | ..................... | B60P 3/1033 114/361 |
| 7,618,085 B1 * | 11/2009 | Bean | ..................... | B60P 3/10 296/157 |
| 9,010,838 B2 * | 4/2015 | LeBlanc | ..................... | B62D 33/0207 296/104 |
| 9,731,640 B1 * | 8/2017 | Meacham | ..................... | B60R 3/00 |
| 2004/0130117 A1 * | 7/2004 | Lipton | ..................... | B62J 19/00 280/204 |
| 2008/0100076 A1 * | 5/2008 | Potts | ..................... | B60R 9/06 296/3 |
| 2009/0007948 A1 * | 1/2009 | Dempsey | ..................... | E04H 15/06 135/96 |
| 2010/0230999 A1 * | 9/2010 | Setzer | ..................... | B60P 3/341 296/173 |
| 2020/0108761 A1 * | 4/2020 | Howell | ..................... | B60P 3/1041 |

* cited by examiner

*Primary Examiner* — S. Joseph Morano
*Assistant Examiner* — Jovon E Hayes
(74) *Attorney, Agent, or Firm* — Law Office of John W. Harbst

(57) ABSTRACT

A trailer mounted protection device (10) for protecting a vehicle (20) positioned on the trailer (18) from debris, the device including a first frame-enclosed panel (13A) and a second frame-enclosed panel (13B), each panel connected to the trailer (18), a first connecting assembly (40, 49A, 49B) for connecting a leading side (26A, 26B) of the frame (12A, 12B) of each panel (13A, 13B) to a forward part of the trailer (18), a second connecting assembly (71) for connecting a trailing side (28A, 28B) of the frame (12A, 12B) of each panel (13A, 13B) to a rearward part of the trailer (18), wherein at least one of the connecting assemblies is adjustable to enable connection of the device (10) to differently sized or differently shaped trailers.

10 Claims, 6 Drawing Sheets

PROTECTION DEVICE FOR A TOWED VEHICLE

CROSS REFERENCE TO RELATED APPLICATION

This U.S. patent application claims priority from Australian Patent Application No. 2018241136, filed 4 Oct. 2018; the entire contents of which are incorporated hereon by reference.

FIELD OF THE INVENTION

This invention relates to a protection device for a towed vehicle and in particular to a protection device for protecting a vehicle, positioned on a trailer, from debris from a surface that the towing vehicle is travelling on.

BACKGROUND OF THE INVENTION

The existing protective devices that prevent road debris, such as stones, glass or rocks making contact with the exterior of a towed vehicle, such as a boat or caravan, generally have connections to the tongue or hitch part of a trailer that connects to a tow ball or similar arrangement on the towing vehicle. An example of this is disclosed in U.S. Pat. No. 7,461,853.

With these existing arrangements having a portion of the protection device or guard attached to the tongue or hitch part of the trailer, it can make it awkward or difficult to access certain parts of the trailer such as the jockey wheel handle or winch. There is therefore a need to provide a protective device that enables clear access to those parts of the trailer and including access to the towed vehicle, for example for cleaning purposes while the vehicle is stowed on the trailer. Another need that existing protection devices do not provide for is flexibility in having a protective guard which is adjustable to cater for either differently sized trailers or differently sized vehicles being towed on the trailer or both.

The present invention seeks to overcome one or more of the above disadvantages by providing a protection device that provides more flexibility in terms of fitting to differently sized trailers and also to enables access to various parts of the trailer components.

SUMMARY OF THE INVENTION

According to an aspect of this invention disclosure, there is provided a trailer protection device for protecting a vehicle positioned on the trailer from debris, the device comprising:

a first frame enclosing a first panel and a second frame enclosing a second panel, each of the first and second frames being connected to the trailer;

a first connecting assembly for connecting a leading portion of the first frame and a leading portion of the second frame to a forward part of the trailer;

a second connecting assembly for connecting a trailing portion of the first frame and a trailing portion of the second frame to a rearward part of the trailer; and wherein at least one of the first connecting assembly and second connecting assembly is adjustable to enable connection of the device to differently sized or differently shaped trailers.

The second connecting assembly preferably comprises a first portion to connect the first frame to the trailer and a second portion to connect the second frame to the trailer.

An opening may exist between the leading sides of each of the first and second frames to enable access to the trailer mounted vehicle and trailer accessories. Preferably each of the first and second panels are made from a layer of tensioned material that covers the internal area defined by each of the first and second frames and is secured to the respective first frame and second frame by securing means that loop through apertures located at the peripheral portions of the material.

Preferably the first connecting assembly is a bracket having first and second ends respectively attachable to a lower portion of one of said leading sides of said first and second frames and attachable to a front portion of the trailer.

The first connecting assembly is preferably adjustable to substantially match the opening between, or alter the distance between, the respective leading sides of the first and second frames.

Preferably the first connecting assembly has a first bar with one or more apertures connected to said bracket first end and a second bar having one or more apertures connected to said bracket second end, said first and second bars being adjustable with respect to slots in said first connecting assembly to in order to secure the first and second bars at a desired position with respect to the first connecting assembly.

Preferably, each of the first portion and second portion of said second connecting assembly has a bracket and an arm associated with the bracket, with said bracket being configured for connection to a lower portion of a trailing side of a respective first or second frame.

Each said arm of each of said first and second portions of said second connecting assembly means is preferably connected to the rearward part of the trailer by connectors and a plate, said rearward part of the trailer located between the arm and the plate.

The layer of tensioned material of said first and second panels may have an opening closable by a zip, to enable access to the front portions of the vehicle positioned on the trailer.

BRIEF DESCRIPTION OF THE DRAWINGS

A preferred embodiment of the invention will hereinafter be described, by way of example only, with reference to the drawings, in which.

DETAILED DESCRIPTION OF THE PREFERRED EMBODIMENT

Figure 1:
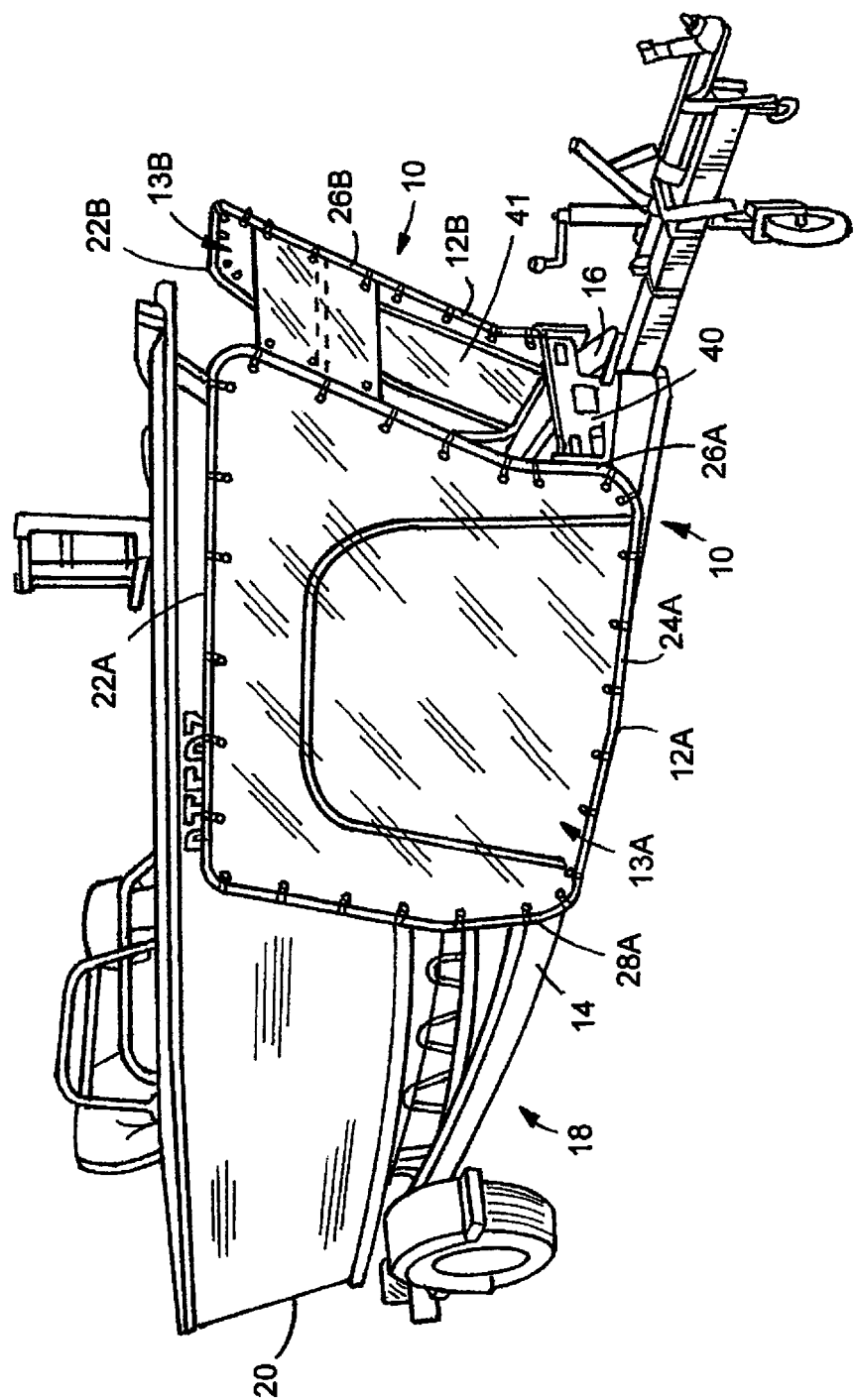
FIG. 1 is a perspective view of a trailer-mounted protection device for protecting the front portion of a vehicle positioned on the trailer, in this case a boat.
Figure 2:
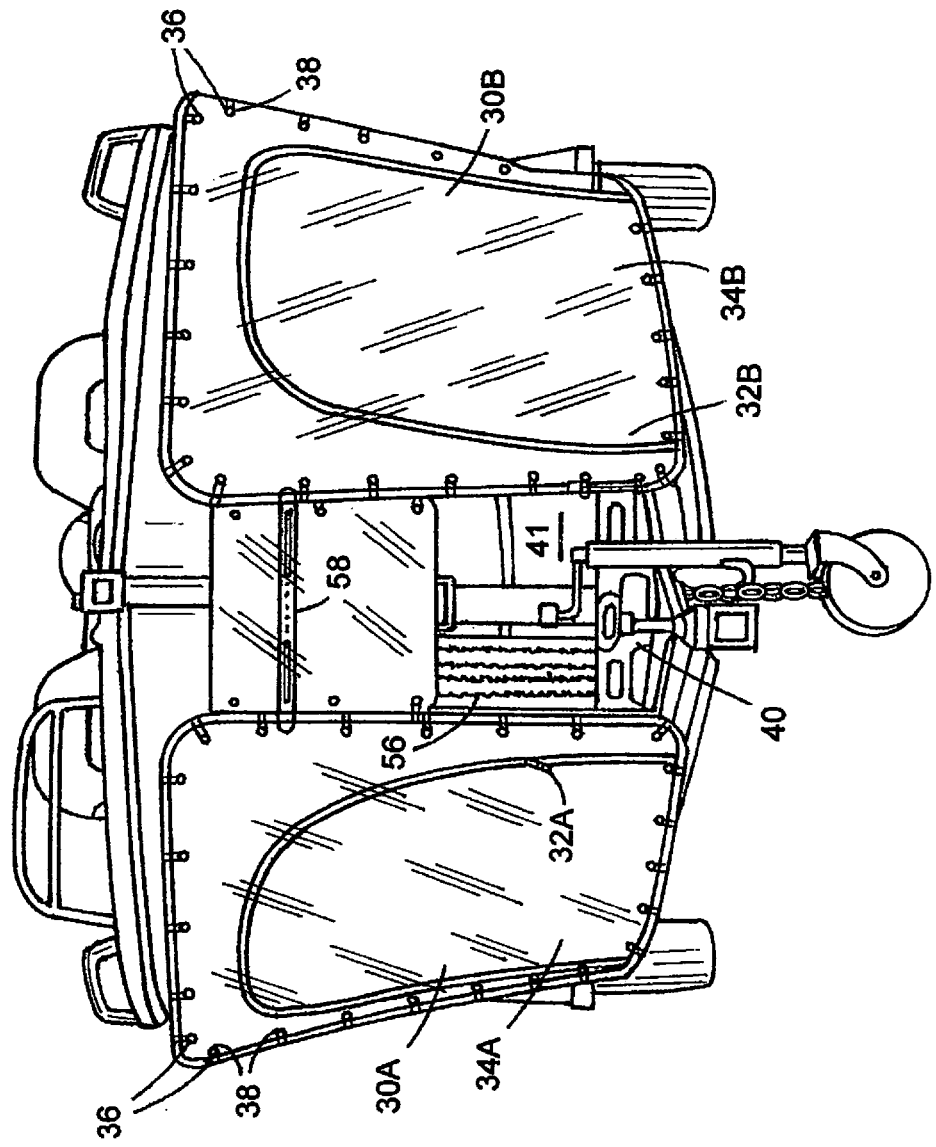
FIG. 2 is a front view of the protection device of FIG. 1.

Referring to FIGS. 1 and 2 there is shown a protection device 10 that has first and second frames 12A and 12B, that form the periphery, or enclose the outer edges, of respective first and second panels 13A and 13B, and that attach to respective first and second members 14 and 16 of a trailer 18 on which is positioned a vehicle, such as a boat 20. Each frame 12A, 12B of each panel 13A, 13B has a top portion 22A, 22B, a bottom portion 24A, 24B, a front side portion or leading side 26A, 26B and a rear side portion or trailing side 28A, 28B. For each frame, 12A, 12B, the portions 22 through to 28 are preferably formed as one continuous tube, preferable steel tube.

Each of the panels 13A and 13B include a pre-tensioned fabric material 30A and 30B, preferably made as a woven PVC mesh. A zip 32A, 32B defines an opening 34A, 34B which enables further access to the vehicle being towed, for cleaning purposes by way of example, or for access to trailer parts such as a spare wheel. The material 30A, 30B is pre-tensioned by the use of a series of securing means 36 that are inserted through a respective aperture or eyelet 38, located near the periphery of the panels 13A, 13B, to secure a portion of the material 30A, 30B to the respective frame 12A, 12B which completely surrounds the material. This is repeated as needed around each of the sides or portions 22A, 22B to 28A, 28B.

Figure 3:
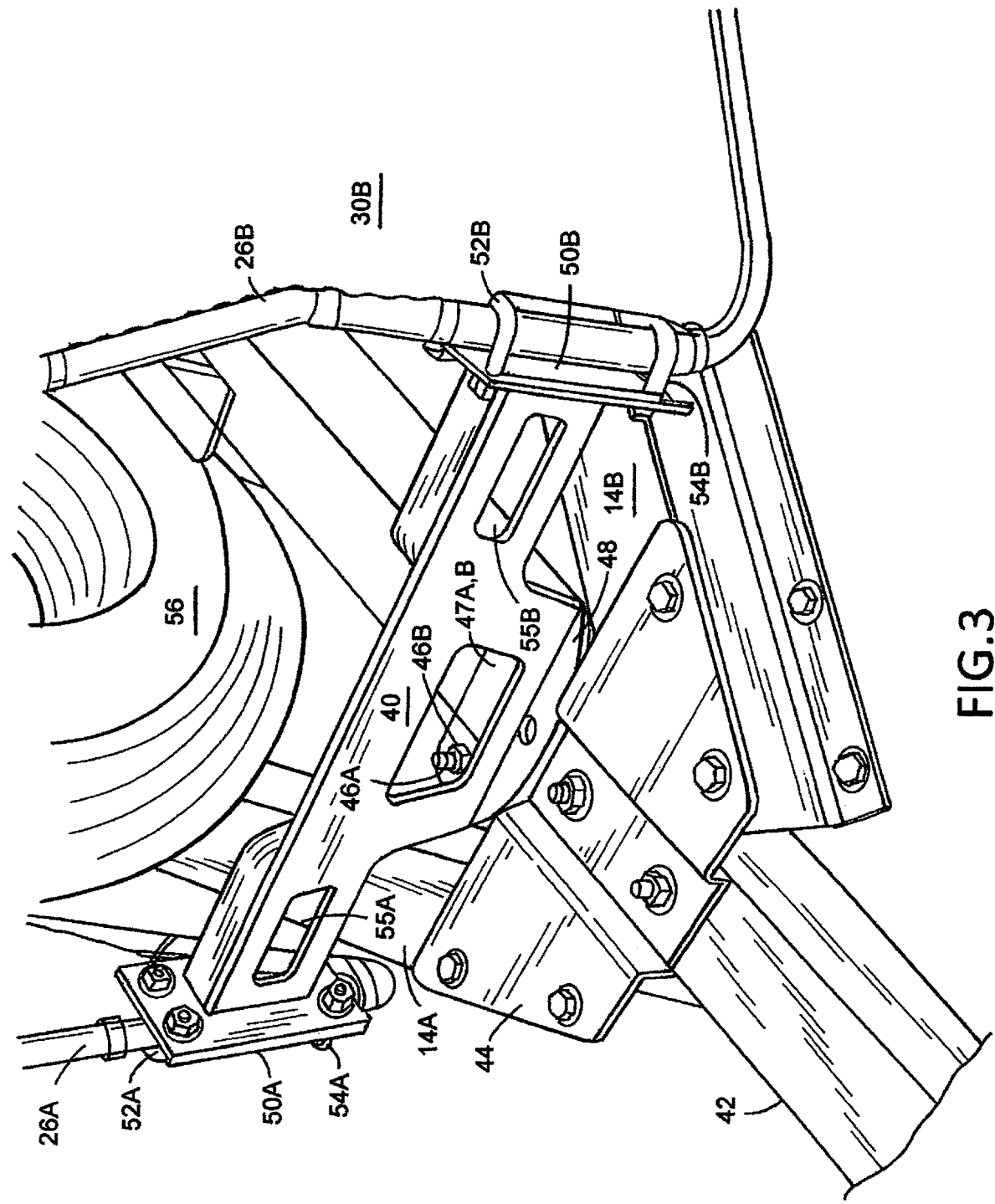
FIG. 3 is a perspective view from above showing a first connecting assembly between respective front or leading sides of first and second frames of the protection device.
Figure 3A:
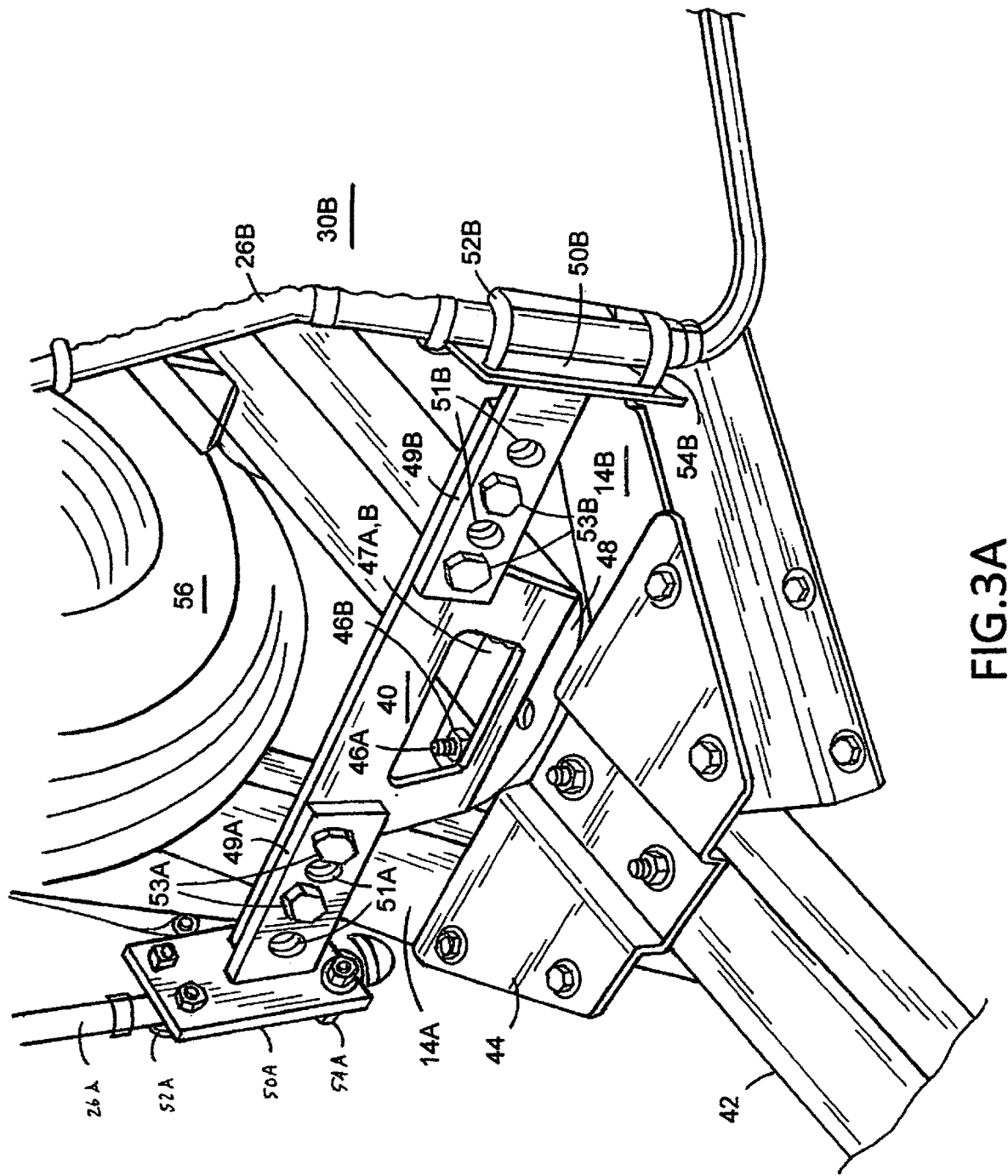
FIG. 3A is a perspective view from above showing the first connecting assembly of FIG. 3 that is adjustable in width to alter the distance between the lower portions of respective front or leading sides of the first and second frames of the protection device.

Referring to FIGS. 3 and 3A, there is shown a first connecting assembly, in the form of a bracket 40, which can be fixed, as shown in FIG. 3, or adjustable, as shown in FIG. 3A. In FIG. 3 the first connecting assembly 40 is a fixed bracket 40 that is able to be secured to a part of tongue 42 but behind the connecting plate 44 of trailer chassis members 14A and 14B. This is seen where a pair of bolts and nuts 46A, 46B and 47A, 47B are used to secure a plate member 48 of the bracket 40 to the rear portion of the tongue 42. The bracket 40 has first and second end plates 50A and 50B which are welded to the remainder of the bracket 40. Each of the end plates 50A, 50B respectively are clamped to a lower portion of the leading sides 26A and 26B through securing means, such as U-bolts 52A, 54A and 52B and 54B. This provides a secure connection arrangement to the lower parts of the leading sides 26A and 26B.

The bracket 40 may be arranged as an adjustable bracket such that the width can be drawn inwardly or outwardly to fit the size of the particular trailer or to adjust the opening or gap between the lower portions of the leading sides 26A, 26B. This is shown in FIG. 3A. Bar 49A is connected to and extends from end plate 50A and has a series of apertures 51A (which may instead be an elongate slot) through the bar 49A, that may be threaded. Bolts 53A can be used to secure the bar 49A to bracket 40 through corresponding apertures in the bracket 40. Alternatively, opening 55A in bracket 40 can be used to secure the bar 49A thereto with corresponding securing means. Similarly, bar 49B is connected to and extends from end plate 50B and has a series of apertures 51B (which may instead be an elongate slot) through the bar 49B, that may be threaded. Bolts 53B can be used to secure the bar 49B to bracket 40 through corresponding apertures in the bracket 40. Alternatively, opening 55B in bracket 40 can be used to secure the bar 49B thereto with corresponding securing means. The selection of one or more of apertures 51A, 51B to extend bolts through is decided once the desired distance between the leading sides 26A and 26B of the frames 12A, 12B is set, which depends on the size of the trailer chassis. Alternatively, bracket 40 can be formed in two parts, and these parts may be secured together through suitable connection means, such as one or more nut and bolt combinations. It is seen that access is provided above the bracket 40, in an opening 41 (FIG. 1) between the two leading sides 26A and 26B, to other equipment on the trailer such as wheel 56.

Figure 5:
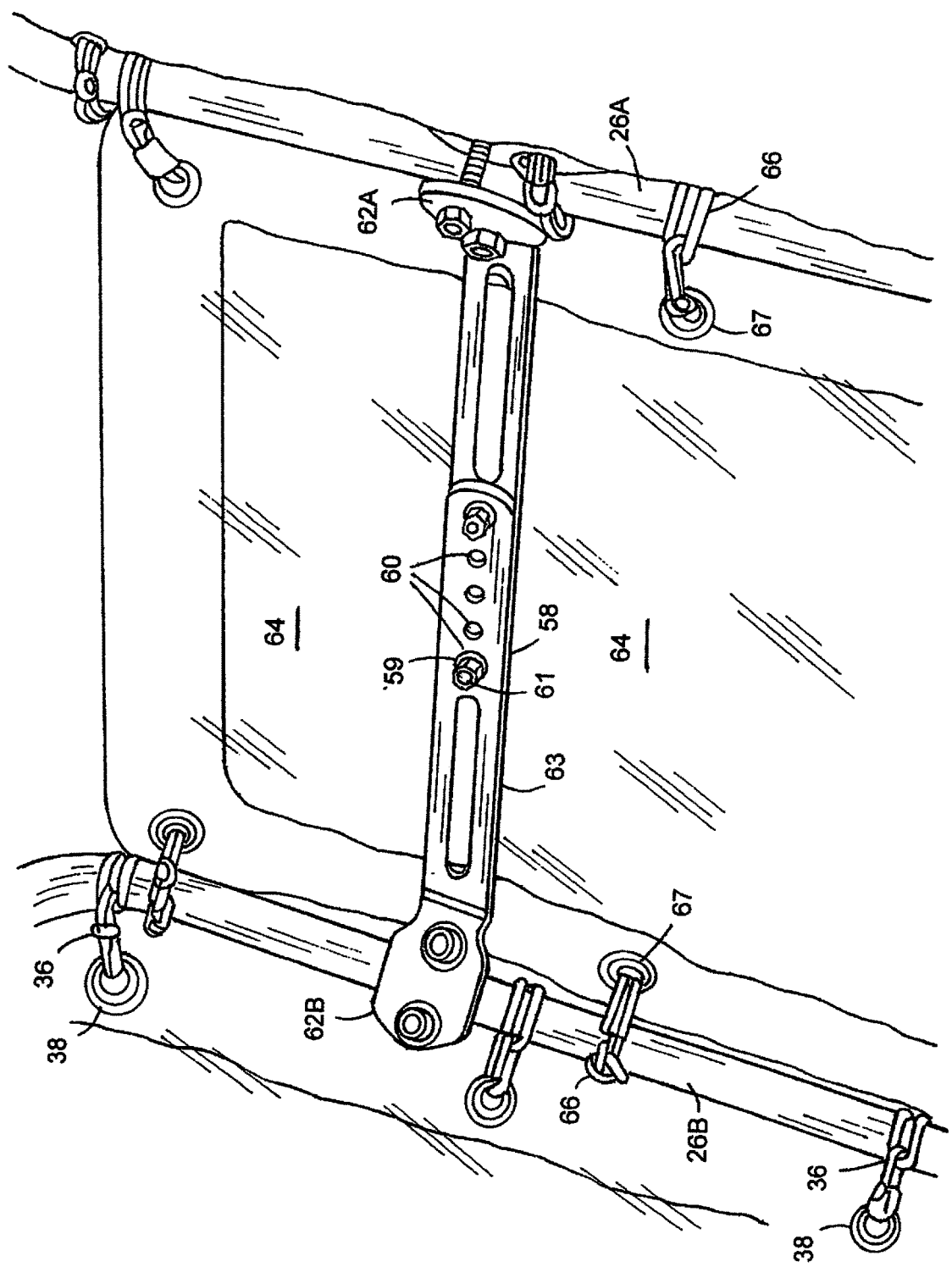
FIG. 5 is a rear perspective view showing a bracing member that is adjustable for connecting upper portions of each of the leading sides of each frame.

Referring to FIGS. 2 and 5 there is shown a bracing member 58 between the leading sides 26A and 26B in the form of an adjustable bracket 58. The bracket 58 is adjustable in width through a series of apertures 60 through which a respective nut 59 and bolt 61 is secured. Ends 62A and 62B of the bracket 58 are respectively connected and secured to the sides 26A and 26B and can be angled with respect to elongate part 63 of bracket 58 to facilitate the connection. A further sheet of deflective fabric material 64, similar to 30A, 30B, can be secured though the securing means 66 (that extend through apertures or eyelets 67 on material 64) to the respective sides 26A and 26B to provide extra protection against stones and debris for the front of the towed vehicle.

Figure 4:
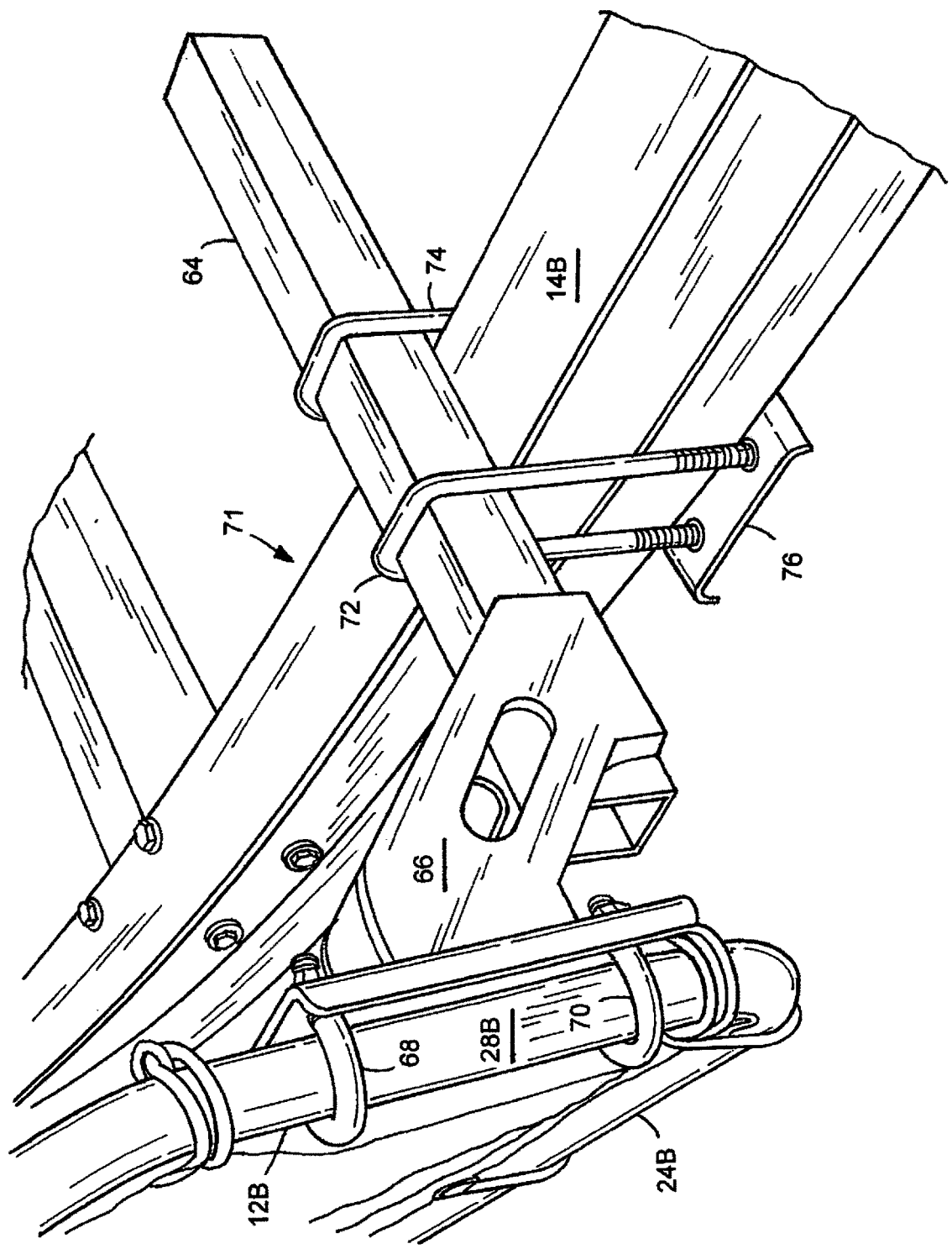
FIG. 4 is a perspective view from above of a second connecting assembly for securing a rear or trailing side of one of the first or second frames to the trailer chassis.

Referring to FIG. 4 there is shown a first portion of a second connecting assembly 71 to connect the rear part of frame 12B and in particular the lower part of trailing side 28B to the chassis member 14B of the trailer 18. An arm 64 is connected to a bracket 66 which in turn is connected to the trailing side 28B through a pair of connectors, such as U-bolts 68 and 70, the U-bolts 68, 70 being tightened by respective nuts. To secure the arm 64 to the chassis member 14B, a further pair of elongated connectors, such as U-bolts 74 and 72, are connected either side of the chassis 14B to a bottom plate 76. Each of the elongated U-bolts 72 and 74 are connected to the plate 76 through respective nuts (not shown). Adjustment can be made to fit various sized chassis frames, like 14B, where the arm 64 can be moved inwardly or outwardly depending on the width of the chassis member 14B or any other trailer chassis. The U-bolts 72 and 74 are accordingly positioned and simply fit to either side of the chassis member 14B. A similar arrangement of the second connecting assembly, being a second portion, is provided for the other frame 12A for connection to chassis member 14A.

The invention claimed is:

1. A trailer mounted protection device for protecting a vehicle positioned on the trailer from debris, the device comprising:
    a first frame enclosing a first panel and a second frame enclosing a second panel, each of the first and second frames being connected to the trailer;
    a first connecting assembly for connecting a leading portion of the first frame and a leading portion of the second frame to a forward part of the trailer;
    a second connecting assembly for connecting a trailing portion of the first frame and a trailing leading portion of the second frame to a rearward part of the trailer; and
    wherein at least one of the first connecting assembly and second connecting assembly is adjustable to enable connection of the device to differently sized or differently shaped trailers.

2. A device according to claim 1 wherein the second connecting assembly comprises a first portion to connect the first frame to the trailer and a second portion to connect the second frame to the trailer.

3. A device according to claim 1 wherein a leading side of each of the first and second frames defines marginal edges of an opening to enable access to the trailer mounted vehicle and trailer accessories.

4. A device according to claim 1 wherein each of said first and second panels are made from a layer of tensioned material that covers the internal area defined by each of the first and second frames and is secured to the respective first frame and second frame by securing fasteners that pass through apertures located at the peripheral portions of the material.

5. A device according to claim 1 wherein the first connecting assembly includes a bracket having first and second ends respectively attachable to a lower portion of one of said leading sides of said first and second frames and attachable to a front portion of the trailer.

6. A device according to claim 5 wherein the first connecting assembly is adjustable to alter the distance between the respective leading sides of the first and second frames.

7. A device according to claim 5 wherein the first connecting assembly has a first bar with one or more apertures connected to said bracket first end and a second bar having one or more apertures connected to said bracket second end, said first and second bars being adjustable with respect to slots in said first connecting assembly in order to secure the first and second bars at a desired position with respect to the first connecting assembly.

8. A device according to claim 2 wherein each of the first portion and the second portion of said second connecting assembly has a bracket and an arm associated with the bracket, with said bracket being connected to a lower portion of the trailing side of a respective first or second frame.

9. A device according to claim 8 wherein said arm of each of said first and second portions of said second connecting assembly is connected to the rearward part of the trailer by connectors and a plate, with said rearward part of the trailer being located between the arm and the plate.

10. A device according claim 4 wherein the layer of tensioned material of said first and second panels has an opening closable by a zipper, to enable access to the front portions of the vehicle positioned on the trailer.

\* \* \* \* \*